ELECTROMAGNETIC POSITIONING DEVICE

Filed Dec. 27, 1955 2 Sheets-Sheet 1

| BINARY NUMBER | | | | DECIMAL NUMBER |
|---|---|---|---|---|
| $2^3$ | $2^2$ | $2^1$ | $2^0$ EVEN OR ODD | |
| 0 | 0 | 0 | 0<br>1 | 0<br>1 |
| 0 | 0 | 1 | 0<br>1 | 2<br>3 |
| 0 | 1 | 0 | 0<br>1 | 4<br>5 |
| 0 | 1 | 1 | 0<br>1 | 6<br>7 |
| 1 | 0 | 0 | 0<br>1 | 8<br>9 |

INVENTOR
F. E. DE MOTTE
BY
Alan C. Rose
ATTORNEY

ELECTROMAGNETIC POSITIONING DEVICE

Filed Dec. 27, 1955 2 Sheets-Sheet 2

INVENTOR
F. E. DE MOTTE
BY Alan C. Rose
ATTORNEY

United States Patent Office 2,827,626

Patented Mar. 18, 1958

2,827,626

ELECTROMAGNETIC POSITIONING DEVICE

Frank E. De Motte, New Vernon, N. J., assignor to Bell Telephone Laboratories, Incorporated, New York, N. Y., a corporation of New York Application December 27, 1955, Serial No. 555,329

11 Claims. (Cl. 340—347)

This invention relates to electromagnetic positioning devices, and more specifically to such devices for converting binary information into decimal information or a decimal display.

Many high speed electronic computers operate in the binary system, in which the numeration base is two, rather than in the decimal system. The computer binary answer must often be translated into the decimal system for use by decimally trained operators. To accomplish this function, many electronic circuits employing matrices, division circuitry and special purpose display tubes have been proposed. However, decimal to binary converters of the foregoing types tend to be unduly complex and expensive.

Accordingly, the principal object of the present invention is to reduce the cost and complexity of binary to decimal signal converters, or display devices.

In accordance with the present invention, four-digit binary signals in the form of signals or four electric circuits are transformed into a decimal signal or display by two spaced electromagnetic structures having mechanically coupled armatures. The two armatures are mounted on a single shaft, and the shaft is rotated to one of ten possible orientations by the energization of the coils of the electromagnetic structures. The circuits representing the three most significant binary digits are connected to coils associated with one of the electromagnet structures to make a rough orientation of the shaft. The circuit representing the least significant binary digit is then employed to energize the other electromagnet to select the precise shaft orientation representing odd or even decimal numbers.

Other objects and various advantages and features of the invention will become apparent by reference to the following detailed description of the drawings taken in conjunction with the attached drawings forming a part thereof, and from the appended claims.

Figures 1, 2:
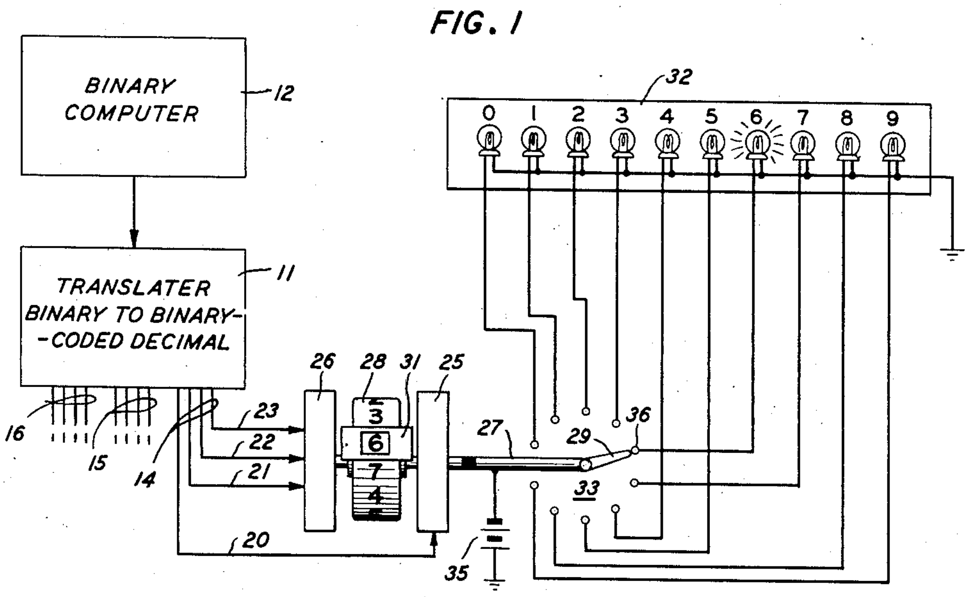
Fig. 1 is a schematic drawing of a system employing a binary to decimal signal converter in accordance with the invention.
Fig. 2 is a table relating four-digit binary numbers with their decimal counterparts.

Referring more particularly to the drawings, Fig. 1 shows, by way of example, a schematic drawing of the converter of the present invention employed at the output of a computer. The translator 11 receives binary output signals from the computer 12, and translates them into decimal coded binary signals. In the binary system of numbers, each digit can have one of two values. Binary digits are customarily represented by the symbols "0" or "1." In electrical circuitry, binary digits are represented by the presence or absence of an electrical signal. In order to represent any one of the decimal digits 0 to 9, four binary digits are required.

In Fig. 1, the translator 11 converts the output from the binary computer 12 into groups of four binary digits, each group representing one of the digits of a decimal number. Techniques and apparatus for converting from binary numbers to decimal-coded binary groups are well known. For example, a method of programming a computer to perform this operation is described at page 86 of volume 2, part 4 of the 1954 Convention Record of the Institute of Radio Engineers.

Three decimal-coded binary groups of four binary digits each are represented by the groups of leads designated 14, 15 and 16. The presence or absence of a binary digit on each of these leads is determined by the presence or absence of an electrical signal applied to the individual leads. The least significant binary digit determines the energization of lead 20 which is connected to the odd-even magnetic selection structure 25. The energization of the remaining leads 21, 22 and 23 in the group of leads designated 14 controls the rough magnetic selection circuit 26. As will be explained in detail hereinafter, the armatures for each of the two magnetic structures 25 and 26 are mounted on a common shaft. The orientation of the shaft 27 determines the position of the display wheel 28 and the brush 29. When the structures 25 and 26 are energized by the group of leads 14, the shaft 27 is rotated to a position corresponding to the binary code energization of the leads 14. When this occurs, a decimal numeral on the code wheel 28 appears at the window 31. In the example shown in Fig. 1, the decimal digit 6 appears at window 31. As indicated in Fig. 2, this corresponds to the binary number 0110, which in turn means that leads 20 and 23 are de-energized while leads 21 and 22 are electrically energized. A supplemental signalling board 32 is energized by the commutator structure 33 associated with the brush 29 mounted on the shaft 27. The brush 29 is energized by a suitable source of voltage 35. Each of the lamps in the signalling board 32 has one filament terminal grounded and the other filament terminal connected to one of the commutator segments in the commutator structure 33. With the shaft 27 oriented as indicated in Fig. 1, the brush 29 makes contact with the commutator segment 36 associated with lamp 6 in the signalling board 32. Accordingly, the lamp representing number 6 is lighted, and the remaining nine lamps are unlighted.

Figure 3:
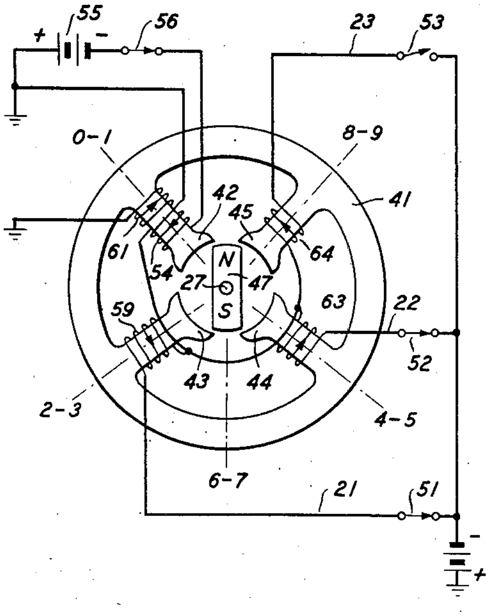
Fig. 3 illustrates one of the two magnetic structures included in the converter.

The magnetic structure 26 of Fig. 1 is shown in detail in Fig. 3. The magnetic structure includes a stationary core portion 41 including four individual pole elements 42, 43, 44 and 45. The inner ends of the four poles 42 through 45 define a generally circular opening in which pivoted permanent magnet armature 47 is located.

The magnetic structure of Fig. 3 is designed to roughly position the shaft 27, which is rigidly secured to the armature 47. More particularly, the structure of Fig. 3 selects one of five possible angular orientations for the magnet armature 47. When none of the leads 21, 22 or 23 are energized, indicating the binary number "000X" (the X indicating that the least significant binary digit is indeterminate), the south pole of the armature 47 will be attracted to pole 42 of the magnetic structure 41. The condition of the switches 51, 52 and 53 in leads 21, 22 and 23 represents the presence or absence of specific binary digits. Thus, when a binary number such as "000X" is present, all three switches 51, 52 and 53 are open. The magnetic biasing force necessary to rotate the armature 47 toward the 0–1 axis is provided by the coil 54, which is energized by a suitable source of biasing voltage 55 through a switch 56. The switch 56 remains closed whenever the converter is in use. It should also be noted that a permanent magnet may be employed to provide the desired magnetic biasing force.

Figure 4:
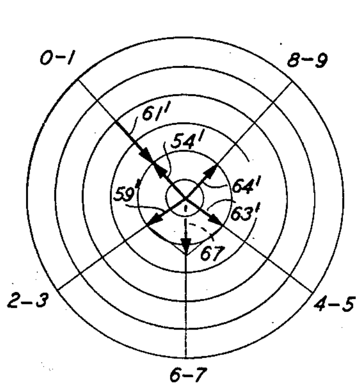
Fig. 4 is a magnetic field vector diagram for the structure of Fig. 3.

Fig. 4 is a magnetic field vector diagram for the structure of Fig. 3. In Fig. 4, the vector 54' represents the biasing force of coil 54. The magnetic force represented by the vector 54' rotates the permanent magnet armature 47 so that the south pole is aligned with the 0–1 axis.

A binary number such as 001X represents the decimal number 2 or 3. When such a number is presented at the magnetic structure 26, switch 51 is closed and switches 52 and 53 are open. Under these circumstances, coil 59 on pole piece 43 and bucking coil 61 on pole piece 42 are both energized. The energization of coil 61 is indicated by the vector 61' in Fig. 4, and is in opposition to the vector 54' representing the biasing magnetic flux from coil 54. Accordingly, referring to Fig. 4, the vector 59' representing the magnetic field resulting from the energization of coil 59 is the only remaining force acting on the permanent magnet armature. The south pole of the armature 47 is therefore drawn toward pole piece 43 in line with the 2–3 axis.

Similarly, a binary number such as 010X is represented by the closure of switch 52, and results in the south pole of armature 47 being drawn toward pole piece 44; and binary numbers such as 100 are represented by the closure of switch 53, and this establishes a magnetic field which draws the south pole of armature 47 toward pole piece 45. The magnetic vectors 63' and 64' in Fig. 4 represent the magnetic field set up by the coils 63 and 64 in pole pieces 44 and 45, respectively.

Decimal numbers 6 and 7 are represented by binary numbers of the form 011X. The position of the "1's" in the binary number 011X indicates that leads 21 and 22 are energized, as by the closure of switches 51 and 52. When switches 51 and 52 are closed, the coils 59 and 63 on pole pieces 43 and 44, respectively, are both energized. The resultant magnetic field is indicated by vector 67 in Fig. 4, which is aligned with the 6–7 axis. In Fig. 3, this situation in which switches 51 and 52 are closed is pictured. As indicated in Fig. 3, the armature 47 is oriented with its south pole pointing in the 6–7 direction midway between pole pieces 43 and 44. When current is supplied to the bucking coil 61 through coil 59 and through coil 63, the magnetic energization represented by vector 61' in Fig. 4 is slightly increased. This effect may be counteracted by the addition of a few turns to the winding 59, as shown in Fig. 3. With this compensation, the armature is properly oriented halfway between poles 43 and 44 when coils 59 and 61 are energized.

In the foregoing description of Figs. 3 and 4, the method of orienting the shaft 27 in one of five possible angles has been demonstrated. The odd-even magnetic selection structure 25 will now be described in detail in connection with Figs. 5 and 6.

The moving portion of the odd-even selection structure includes a circular nonmagentic plate 71 and five small magnetic elements 72 through 76. The nonmagnetic plate 71 is oriented on shaft 27 so that one of the five small magnetic elements 72 through 76 is placed in the magnetic field of influence of electromagnets 81 and 82 whenever the magnetic structure 26 positions the permanent magnetic armature 47 to one of the five possible angular orientations. Therefore, when the decimal number is even (including zero), one of the armature elements 72 through 76 will be drawn between the poles of the electromagnet 81. When the demical number is odd, however, one of the magnetic elements 72 through 76 will be drawn between the poles of electromagnet 82.

Figure 5:
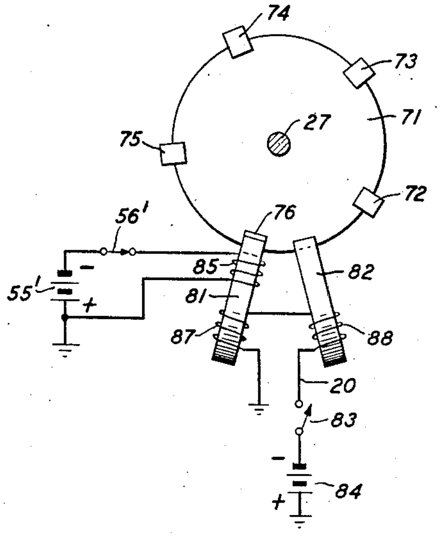
Figs. 5 and 6 are alternative views of the second magnetic structure included in the converter.
Figure 6:
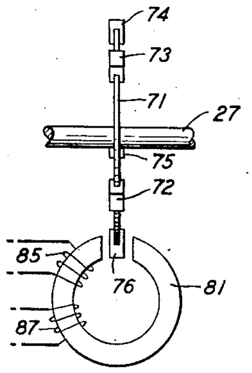

The least significant binary digit is represented by the energization or de-energization of lead 20. This is indicated in Fig. 5 by the condition of switch 83. When switch 83 is open, a biasing magnetic field produced by the energization of coil 85 by voltage source 55' draws one of the magnetic elements 72 through 76 between the pole pieces of electromagnet 81. Alternatively, the biasing magnetic field may be produced by employing a permanently magnetized core instead of by the coil 85. When switch 83 is closed, the source of voltage 84 is connected to coils 87 and 88. Under these conditions, the magnetic field in winding 85 is bucked out by the energization of coil 87, and the energization of coil 88 on the core of electromagnet 82 draws one of the magnetic elements 72 through 76 between the pole pieces of magnet 82. In this manner, the shaft 27 is accurately positioned in one of the ten possible angular positions corresponding to the ten decimal-coded binary numbers indicated in Fig. 2.

It may be noted that the 6–7 axis is located midway between the 2–3 and the 4–5 axes. Accordingly, the decimal digits 6 and 7 occur between the decimal digits 3 and 4 on the code indicating wheel 28 of Fig. 1. Similarly, the leads to the light bulbs in panel 32 representing numbers 6 and 7 are connected to commutator segments located between the segments connected to light bulbs representing decimal digits 3 and 4 in panel 32.

It is to be understood that the above-described arrangements are illustrative of the application of the principles of the invention. Numerous other arrangements may be devised by those skilled in the art without departing from the spirit and scope of the invention.

What is claimed is:

1. In a device for converting binary electrical signals into decimal signals, four electric circuits, means for energizing said four electric circuits in accordance with said binary signals, a rotatable shaft, first and second armature structures mounted on said shaft, a first magnetic structure having four poles in magnetic coupling proximity to said first armature, at least two separately energizable coils mounted on a first one of said poles, three additional coils mounted respectively on the remaining three poles, means for applying a biasing energizing current to one of said coils on said first pole, means for energizing another coil on said first pole in opposition to the energization by said first coil when any of the coils on said other poles are energized, means for connecting the coils on said three remaining poles to the three of said circuits bearing the most significant binary information, whereby said shaft is roughly positioned in one of five orientations by said four-pole structure, means including a second magnetic structure in magnetic coupling proximity to said second armature structure and connected to the remaining one of said circuits for accurately positioning said shaft in one of two orientations associated with each of said five positions, and ten different decimal digit indicators associated respectively with each of the ten shaft orientations.

2. In a decimal display device for binary signals, a rotatable shaft, first means including a fixed electromagnetic structure and an armature secured to said shaft for roughly positioning said shaft in a selected one of five positions, second means including another fixed electromagnetic structure and another armature secured to said shaft for accurately positioning said shaft in the odd or even position associated with the selected rough position, and a decimal display device mounted on said rotatable shaft.

3. In combination, a shaft, a permanent magnet armature secured to said shaft, means for roughly orienting said permanent magnet in a plurality of positions, a second armature structure spaced from said permanent magnet armature and secured to said shaft in a fixed angular position with respect to said permanent magnet armature, and means for accurately positioning said second armature structure in one of a plurality of positions associated with each of the rough positions established by said permanent magnet armature.

4. In a device for converting binary electrical signals into decimal form, four electric circuits, means for energizing said four electric circuits in accordance with the binary signal information, a rotatable shaft, first and second armature structures mounted on said shaft, first means including a first magnetic structure in magnetic coupling proximity to said first armature and connected to three of said electric circuits for roughly positioning said shaft, and second means including a second magnetic structure in magnetic coupling proximity to said second armature structure and connected to the remaining one of said circuits for accurately positioning said shaft.

5. In a decimal display device for binary electrical signals, four electric circuits, means for energizing said four electric circuits in accordance with the binary signal information, a rotatable shaft, first and second armature structures mounted on said shaft, a first magnetic structure having four poles in magnetic coupling proximity to said first armature, at least two separately energizable coils mounted on a first one of said poles, three additional coils mounted respectively on the remaining three poles, means for applying a biasing energizing current to one of said coils on said first pole, means for energizing another coil on said first pole in opposition to the energization by said first coil when any of the coils on said other poles are energized, means for connecting the coils on said three remaining poles to the three of said circuits bearing the most significant binary information, whereby said shaft is roughly positioned in one of five orientations by said four-pole structure, means including a second magnetic structure in magnetic coupling proximity to said second armature structure and connected to the remaining one of said circuits for accurately positioning said shaft in one of two orientations associated with each of said five positions, ten different decimal digit indicators associated respectively with each of the ten shaft orientations, and means for selecting the decimal digit indicators representing the digits 6 or 7 when said first armature is oriented between two poles of said four-pole structure.

6. In combination, an armature, an electromagnetic structure having at least three poles in magnetic coupling proximity to said armature, first and second coils mounted on a single one of said poles, third and fourth coils mounted on respectively different poles of said electromagnetic structure, means for applying a biasing energizing circuit to said first coil, means for energizing said second coil in opposition to the energization of said first coil whenever said third or said fourth coils are energized, and means for selectively energizing said third and fourth coils.

7. In combination, a shaft, a first armature structure secured to said shaft, means for roughly orienting said first armature in a plurality of positions, a second armature structure spaced from said first armature and secured to said shaft, and means for accurately positioning said second armature structure in either of two positions associated with each of said rough positions.

8. In a decimal display device for binary electrical signals, four electric circuits, means for energizing said four electric circuits in accordance with the binary signal information, a rotatable shaft, first and second armature structures mounted on said shaft, first means including a first magnetic structure in magnetic coupling proximity to said first armature and connected to three of said electric circuits for roughly positioning said shaft, second means including a second magnetic structure in magnetic coupling proximity to said second armature structure and connected to the remaining one of said circuits for accurately positioning said shaft, and a decimal display device mounted on said rotatable shaft.

9. In a decimal display device for binary electric signals, three electric circuits, means for energizing said electric circuits in accordance with the binary signal information, a rotatable shaft, an armature srtucture mounted on said shaft, a four-pole magnetic structure in magnetic coupling proximity to said armature, at least two separately energizable coils mounted on a first one of said poles, three additional coils mounted respectively on the remaining three poles, means for applying a biasing energizing current to one of said coils on said first pole, means for energizing another coil on said first pole in oppositon to the energization by said first coil when any of the coils on said other poles are energized, means for connecting the coils on said three remaining poles to said electric circuits, whereby said shaft is roughly positioned in one of five orientations by said four-pole structure, and five pairs of different decimal digit indicators associated respectively with each of said five shaft orientations.

10. In a decimal display device for binary electrical signals, three electric circuits, means for energizing said electric circuits in accordance with the binary signal information, a rotatable shaft, an armature structure mounted on said shaft, a four-pole magnetic structure in magnetic coupling proximity to said armature, at least two separately energizable coils mounted on a first one of said poles, three additional coils mounted respectively on the remaining three poles, means for applying a biasing energizing current to one of said coils on said first pole, means for energizing another coil on said first pole in opposition to the energization by said first coil whenever any of the coils on said other poles are energized, means for connecting the coils on said three remaining poles to said electric circuits, whereby said shaft is roughly positioned in one of five orientations by said four-pole structure, five pairs of different decimal digit indicators associated respectively with each of said five shaft orientations, and means for selecting the decimal digit indicators representing the digits 6 and 7 when said first armature is oriented between two poles of said four-pole structure.

11. In combination, an armature, an electromagnetic structure having at least three poles in magnetic coupling proximity to said armature, magnet means associated with a first one of said poles for providing a biasing magnetic field tending to pull said armature toward said first pole, at least one buckling coil on said first pole, additional coils mounted respectively on the second and third poles, means for energizing said bucking coil to cancel the biasing field provided by said magnet means whenever any of said additional coils are energized, and means for selectively energizing said additional coils.

References Cited in the file of this patent

UNITED STATES PATENTS

| | | |
|---|---|---|
| 2,192,421 | Wallace | Mar. 5, 1940 |
| 2,591,555 | Klope | Apr. 1, 1952 |
| 2,630,562 | Johnson | Mar. 3, 1953 |
| 2,748,382 | Hults | May 29, 1956 |
| 2,241,548 | Frischknecht | May 13, 1941 |